United States Patent [19]

Kitagawa et al.

[11] Patent Number: 4,933,382

[45] Date of Patent: Jun. 12, 1990

[54] EPOXY RESIN POWDER COATING COMPOSITION

[75] Inventors: Katugi Kitagawa, Saitama; Akira Shinozuka, Chiba, both of Japan

[73] Assignee: Somar Corporation, Tokyo, Japan

[21] Appl. No.: 412,616

[22] Filed: Sep. 26, 1989

Related U.S. Application Data

[63] Continuation-in-part of Ser. No. 246,838, Sep. 20, 1988, abandoned.

[51] Int. Cl.$^5$ .......................... C08K 3/26; C08L 63/02
[52] U.S. Cl. ...................................... 523/428; 523/429; 523/434
[58] Field of Search ....................... 523/428, 429, 434; 525/119, 121, 122

[56] References Cited

U.S. PATENT DOCUMENTS

| | | | |
|---|---|---|---|
| 3,655,818 | 4/1972 | McKown | 523/428 |
| 4,500,660 | 2/1985 | Minamisawa et al. | 523/434 |
| 4,798,761 | 1/1989 | Wykowski et al. | 523/434 |

FOREIGN PATENT DOCUMENTS 62-192422  8/1987  Japan ..................... 523/429

*Primary Examiner*—Lewis T. Jacobs
*Attorney, Agent, or Firm*—Sughrue, Mion, Zinn, Macpeak & Seas

[57] ABSTRACT

An epoxy resin powder coating composition which comprises:
   (A) an epoxy resin comprising mainly of a bisphenol A epoxy resin mixture of (a) a bisphenol A epoxy resin having a number average molecular weight of from 2,500 to 8,000 and (b) a bisphenol A epoxy resin having a number average molecular weight of from 350 to 1,700, said mixture having a number average molecular weight of from 1,700 to 4,500;
   (B) rubber powder in an amount of 2 to 30 parts by weight per 100 parts by weight of said epoxy resin (A);
   (C) at least one hardener; and
   (D) a filler.

The coating composition is particularly useful for the insulation of slots for motor rotors, exhibiting excellent thermal resistance, adhesiveness, impact resistance and coverage.

14 Claims, No Drawings

EPOXY RESIN POWDER COATING COMPOSITION

This is a continuation-in-part, of application Ser. No. 07/246,838, filed Sept. 20, 1988 now abandoned.

FIELD OF THE INVENTION

The present invention relates to an epoxy resin powder coating composition suitably used for the insulation of slots of motor rotors.

BACKGROUND OF THE INVENTION

Epoxy resin powder coating compositions are widely used for the insulation of electric and electronic equipments and parts. Examples are in JP-A Nos. 55-84371 and 57-42760 (the term "JP-A" as used herein means an unexamined published Japanese patent application) which disclose powder coating compositions comprising a rubber modified epoxy resin, a hardener, and a filler. Those powder coating compositions are effective to form insulating films on smooth surfaces, however, they are not satisfactory as insulating powder coating compositions for slots having edges such as in motor rotors and stators of electric and electronic equipments and parts.

A temperature of 180° C. or higher is required to rapidly harden the epoxy resin to form insulating films on slots having edges. However, the aforesaid conventional epoxy resins, when heated under such a temperature condition, fail to form films with sufficient thickness on the edge parts, and, moreover, lack the necessary physical properties such as thermal resistance, adhesiveness, and impact resistance. In addition, surface smoothness is not attained.

SUMMARY OF THE INVENTION

The present invention aims to provide an epoxy resin powder coating composition which overcomes the aforesaid shortcomings of the conventional epoxy resin powder coating compositions.

That is, the present invention provides an epoxy resin powder coating composition which comprises:

(A) an epoxy resin comprising mainly of a bisphenol A epoxy resin mixture having a number average molecular weight of from 1,700 to 4,500 comprising (a) a bisphenol A epoxy resin having a number average molecular weight of from 2,500 to 8,000 and (b) a bisphenol A type epoxy resin having a number average molecular weight of from 350 to 1,700;

(B) rubber powder in an amount of 2 to 30 parts by weight per 100 parts by weight of said epoxy resin (A);

(C) at least one hardener; and (D) a filler.

DETAILED EXPLANATION OF THE INVENTION

The epoxy resin used in the present invention is based on bisphenol A epoxy resin. The bisphenol A epoxy resin is prepared by blending a bisphenol A epoxy resin having a number average molecular weight of from 2,500 to 8,000 with that having a number average molecular weight of from 350 to 1,700.

The mixture has a number average molecular weight of from 1,700 to 4,500, preferably from 1,800 to 4,000, and more preferably from 2,000 to 3,000. When the number average molecular weight is less than 1,700, the edge coverage decreases, and when it exceeds 4,500, it is not appropriate since adhesiveness or surface smoothness of film formed there form is damaged and is apt to form pinholes.

The bisphenol A epoxy resin is a synthetic resin obtained by condensation polymerization of bisphenol A and epichlorohydrin, and is represented by general formula (I):

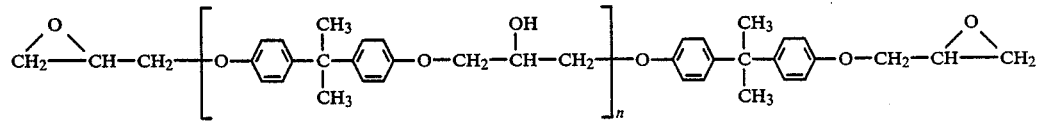

wherein n is a degree of polymerization.

The bisphenol A epoxy resin a having a number average molecular weight of from 2,500 to 8,000 suitably used in the present invention has a melting point of from 120° to 160° C., and preferably from 130° to 150° C. The number average molecular weight of (a) is preferably from 2,700 to 6,500.

The other bisphenol A epoxy resin b having a number average molecular weight of from 350 to 1,700 has a melting point of 100° C. or lower, preferably being in the liquid phase at ordinary temperature. The number average molecular weight of (b) is preferably from 800 to 1700.

A mixture of (a) and (b) is used for the present invention.

Also, a third different bisphenol A epoxy resin with a number average molecular weight of from 1,700 to 2,500 may be added in a small amount (generally, of from 5 to 40% by weight, preferably from 5 to 35% by weight, and more preferably from 10 to 30% by weight of the total amount of the epoxy resins) such that the average molecular weight of the resulting mixture is in the number range of from 1,700 to 4,500. Further, an epoxy resin of a different type may be added in an amount of, generally from 5 to 40% by weight, preferably from 5 to 35% by weight, and more preferably from 10 to 30% by weight of the total amount of the epoxy resins.

Example of epoxy resins other than bisphenol A include polyfunctional epoxy resins having three or more epoxy groups in the molecule. Such epoxy resins include novolak type (o-cresol novolak type, phenol novolak type, etc.) epoxy resins, triglycydyl ether type resins (epoxy compounds of cyanuric acid or triphenylpropane) and tetraglycidyl ether type epoxy resins (epoxy compounds of bisresorcinol F or tetraoxy tetraphenylethane, etc.).

When the polyfunctional epoxy resin is used in the coating composition of the present invention, the proportion of the polyfunctional epoxy resin is generally from 5 to 40% by weight, preferably from 5 to 35% by weight, and more preferably from 10 to 30% by weight of the total amount of the epoxy resins.

Other types of epoxy resins may be used in the present invention, provided that the epoxy resin other than bisphenol A should not be incorporated in an amount of more than 40% by weight of the total epoxy resin.

In the powder coating composition of the present invention, rubber powder is blended. The content of the rubber powder in the coating composition is from 2 to 30 parts, preferably from 5 to 15 parts by weight, per 100 parts by weight of the total amount of epoxy resin. This relative content provides for a powder coating composition having a coating property especially improved in edge coverage and thermal resistance.

The rubber powder used in the present invention is essentially chemically inert to epoxy resin. Further, it substantially disperses in the solid state when mixed with molten epoxy resin.

Examples of rubber powders are nitrile/butadiene based rubber (NBR), a chloroprene rubber, butadiene rubber, isoprene rubber, etc. The particle size of the rubber should be in the range of from about 100 to 500 μm, preferably from 130 to 250 μm.

When it is mixed with molten epoxy resin, it is preferable to use the rubber powder in a mixture with a filler, especially with calcium carbonate. The rubber powder is better dispersed in molten epoxy resin when used as a mixture. Moreover, rubber powder is more readily ground to fine powder and the filler incorporated in the mixture avoids blocking of the finely ground rubber powder.

The amount of filler added is preferably from 5 to 25 parts, and more preferably from 10 to 20 parts, by weight, per 100 parts by weight of rubber powder.

The hardener to be blended with the powder coating composition of the present invention includes those conventionally used, such as aromatic amines, acid anhydrides, guanidines (dicyandiamide, etc.), and imidazoles. To acheive optimal gloss, adhesiveness and edge coverage, two or more hardeners having different hardening speeds can be appropriately blended to give a mixture of hardeners with controlled hardening speed. Too high a hardening speed results in a hardener which gives a dull coating with poor adhesiveness, and too low a speed results in poor edge coverage. The amount of hardener added differs according to the type. An example is an imidazole type hardener which is added in an amount of from 0.1 to 5 parts, preferably from 0.2 to 4 parts by weight per 100 parts by weight of the total amount of the epoxy resins.

In the case of using a combination of hardeners having different hardening speeds, the high speed hardener can function as a hardening promoter for the low speed hardener.

Specific examples of the low speed hardeners include 2-methyl imidazole, diaminodiphenylsulfone, diaminodiphenylether, etc.

Specific examples of the high speed hardeners include 2,4-diamino-6-[2'-methylimidazolyl (1)]ethyl-s-triazine, 2-phenyl imidazole, 2-ethyl-4-methyl imidazole, etc.

When a mixture of two or more hardeners having different hardening speeds is employed, the combination of an imidazole type high speed hardener with a low speed hardener chosen from below is preferred.

Examples of imidazole compounds that are high speed hardeners can be expressed in accordance with general formula (II);

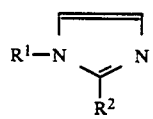
(II)

wherein $R^1$ represents a hydrogen atom or an alkyl group substituted with an aryl group

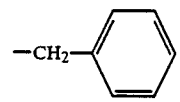

and $R^2$ represents a substituted or unsubstituted alkyl group (e.g., $CH_3$, $C_2H_5$, $CH(CH_3)_2$, $C_{11}H_{23}$, $C_{17}H_{35}$) or an aryl group (e.g., phenyl, tolyl, xylyl). Preferably, the alkyl group has 1 to 20 carbon atoms and the aryl group has 6 to 20 carbon atoms.

Examples of imidazole compounds that are low speed hardeners can be expressed in accordance with general formula (III);

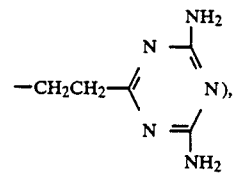
(III)

wherein $R^3$ represents an alkyl group substituted with a cyano group (e.g., $-CH_2CH_2CN$), or a group of

and $R^4$ represents a substituted or unsubstituted alkyl group (e.g., $CH_3$, $C_2H_5$, $CH(CH_3)_2$, $C_{11}H_{23}$, $C_{17}H_{35}$) or an aryl group (e.g., phenyl, tolyl, xylyl). Preferably, the alkyl group has 1 to 20 carbon atoms and the aryl group has 6 to 20 carbon atoms.

In the case of using a combination of imidazole type hardeners, preferably 0.05 to 0.7 part by weight of a high speed hardener is used with 0.5 to 3 parts by weight of a low speed hardener per 100 parts by weight of the total amount of epoxy resins.

Inorganic fillers suitably blended with the composition of the present invention include silica, calcium carbonate, alumina, clay, mica, talc, and powdered glass fibers. The amount to be blended is generally from 10 to 80%, and preferably from 20 to 50%, by weight, of the total weight of the powder coating composition.

Conventional additives such as leveling agents (e.g., acrylic acid ester oligomers), pigments (e.g., $Cr_2O_3$, $Fe_2O_3$), impact resistance improvers (e.g., butadiene-acrylonitrile copolymer, butyral resin), and hardening promoters (e.g., 2-phenylimidazole, 2-ethyl-4-methylimidazole) may be appropriately blended with the powder coating composition of the present invention.

Conventional methods can be used to blend the components of the epoxy resin powder coating composition of the present invention. For example, the components can be dry-mixed with a mixer or the like, melt-mixed using a kneader or the like, or solidified by cooling after melt-mixed using an extruder or the like, and then ground to fine particles.

The present invention is hereinafter described in greater detail with reference to the examples, which are not to be construed as limiting the scope thereof. Unless otherwise indicated, all parts, percents and ratios are by weight.

EXAMPLE 1

Epoxy resin powder coating compositions as shown in Table 1 were prepared. The following are the explanations for the components in Table 1.

Epikote 1007 a bisphenol-A epoxy resin having a number average molecular weight of about 2,900, with a melting point of 128° C.; from Yuka Shell Epoxy Co. Ltd.

EOCN 104 an o-cresol novolak epoxy resin having a softening point of 95° C.; from Nippon Kayaku Co. Ltd.

Epikote 1004 a bisphenol-A epoxy resin having a number average molecular weight of about 1,600, with a melting point of 98° C.; from Yuka Shell Epoxy Co. Ltd.

Rubber modified epoxy resin an epoxy resin modified with a liquid nitrile rubber having a —COOH group at the end, with a melting point of 100° C.; Epomic SR-35K from Mitsui Petrochemicals Industries, Ltd.

Rubber Powder a mixture containing 87% by weight of rubber having a Mooney viscosity of 75 to 85 and 13% by weight of calcium carbonate; the calcium carbonate powder is substantially adhered on the surface of the rubber particles. The particle distribution is as follows: 0.5% of over 35 μm mesh, 2.5% of over 42 μm mesh, 22% of over 60 μm mesh, 43% of over 80 μm mesh, 18.5% of over 125 μm mesh, and 13.5% of under 125 μm mesh. HI-BLOW HF-21 from Nippon Zeon Co., Ltd.

Hycar-CTBN a butadiene-acrylonitrile copolymer with carboxyl groups at both ends, having a viscosity of 1,200 poises at 27° C.; from The B. F. Goodrich Chemical Corp.

Leveling agent: an acrylic ester oligomer

Hardener A: 2-methylimidazole

Hardener B: 2,4-diamino-6-[2'-methylimidazolyl (1)]ethyl-s-triazine

DAM: 4,4'-diaminodiphenylmethane

ADH: Adipic acid dihydrazide

Then, each of the aforesaid samples were coated on slots of motor rotors at 180° to 260° C. using a flow-immersion method, and the properties of each of the obtained films were investigated using the methods as follows. The results are given in Table 2.

(1) Edge coverage

A half-inch square bar was coated with the powder coating composition at a thickness of about 0.3 mm and subjected to ASTM D-2967 standardized measurements. Those having higher ratio (%) are evaluated as having excellent edge coverage.

(2) Thermal resistance

A metal mold having a concave area of 12.7 mm width, 170 mm length, and 12.7 mm depth was first heated to 160° to 170° C., then, the powder coating composition was applied to the heated metal mold for 10 to 15 minutes, then molded, and thermoset at 170° C. for 20 minutes. The heat deformation temperature (HDT) of the hardened body was obtained according to the ASTM D-648 standard. Those having higher HDTs have higher thermal resistances.

(3) Adhesiveness

Two degreased test pieces (soft steel plates of 100 mm×20 mm×3 mm) were heated to about 200° C. The powder coating composition was adhered in the molten state on the upper surface (20 mm wide and about 15 mm long) of the tip of the either test piece, and was applied to the tip (20 mm wide and 10 mm long) of the other test piece under a load of 1 kg at 200° C. for 10 minutes to harden by heating. Then, the test pieces were left at room temperature and the tensile strength at which the joint broke was measured. Those having larger strength are evaluated as having excellent adhesiveness.

(4) Impact resistance

Preparation of the coated test piece:

A soft steel plate of 60×60 mm and 3.2 mm thick was coated with the powder coating composition and thermoset to obtain a film of about 0.3 mm in thickness. Measurements:

A DuPont-type impact tester was employed. A semi-spherical striker 1 kg in weight having a head with a curvature radius of ¼ inch was dropped onto the above coated sample placed on a table having a semispherical hole with a curvature radius of about ¼ inch to concavely deform the plate, and the dropping distance necessary to break and peel off the coating was measured. Those samples requiring a dropping length of 30 cm or longer were evaluated to have fair impact resistance.

(5) Specular gloss

The same test piece used for measuring the impact strength was employed except that the film thickness was 0.2 mm. The 60-degree specular gloss was measured according to the JIS Z-8741 standardized method. Those having larger specular gloss are evaluated as having excellent surface smoothness. The values shown are values relative to that of the reference plane defined in the JIS Z-8741 as 100.

TABLE 1

| Composition component | Sample No. | | | | | | | | | | |
|---|---|---|---|---|---|---|---|---|---|---|---|
| (part by weight) | 1 | 2 | 3 | 4 | 5 | 6 | 7* | 8* | 9* | 10* | 11* |
| Epikote 1007 | 30 | 30 | 30 | 30 | 30 | 30 | — | — | 30 | — | 30 |
| EDCN 104 | 10 | 10 | 10 | 10 | 10 | 10 | 10 | 10 | 10 | 10 | 10 |
| Epikote 1004 | 60 | 60 | 60 | 60 | 60 | 60 | — | — | 60 | 31.5 | 60 |
| Rubber modified epoxy resin | — | — | — | — | — | — | 100 | 100 | — | 65 | — |
| Rubber powder | 6.5 | 10.0 | 10.0 | 10.0 | 3.0 | 15.0 | — | — | — | — | — |
| Hycar-CTBN | — | — | — | — | — | — | — | — | — | — | 6.5 |
| Calcium carbonate | 35 | 35 | 60 | 60 | 35 | 60 | 35 | 60 | 60 | 35 | 60 |
| Levelling agent | 0.2 | 0.2 | 0.2 | 0.2 | 0.2 | 0.2 | 0.2 | 0.2 | 0.2 | 0.2 | 0.2 |
| Hardener A | 0.35 | 0.4 | 0.4 | 0.35 | 0.35 | 0.4 | 0.4 | 0.4 | 0.4 | 0.35 | 0.35 |
| Hardener B | — | 1.4 | 1.4 | — | — | 1.4 | 1.4 | 1.4 | 1.4 | — | — |
| DAM | 1.0 | — | — | 1.0 | 1.0 | — | — | — | — | 1.0 | 1.0 |

TABLE 1-continued

| Composition component (part by weight) | Sample No. | | | | | | | | | | |
|---|---|---|---|---|---|---|---|---|---|---|---|
| | 1 | 2 | 3 | 4 | 5 | 6 | 7* | 8* | 9* | 10* | 11* |
| ADH | 5.0 | — | — | 5.0 | 5.0 | — | — | — | — | 5.0 | 5.0 |
| Chromium oxide | 3.0 | 3.0 | 3.0 | 3.0 | 3.0 | 3.0 | 3.0 | 3.0 | 3.0 | 3.0 | 3.0 |

*Comparative sample

TABLE 2

| Film Properties | Sample No. | | | | | | | | | | |
|---|---|---|---|---|---|---|---|---|---|---|---|
| | 1 | 2 | 3 | 4 | 5 | 6 | 7* | 8* | 9* | 10* | 11* |
| Number-average molecular weight of bisphenol A epoxy resin. | 2,050 64 | 2,050 62 | 2,050 63 | 2,050 60 | 2,050 55 | 2,050 65 | — 44 | — 45 | 2,050 41 | 1,600 39 | 2,050 54 |
| Thermal resistance (HDT, °C.) | 125 | 125 | 127 | 127 | 125 | 123 | 108 | 110 | 113 | 115 | 105 |
| Adhesiveness (kg/cm$^2$) | 235 | 240 | 241 | 244 | 228 | 255 | 210 | 212 | 185 | 215 | 195 |
| Impact resistance (cm) | 45 | 45–50 | 45–50 | 45 | 45 | ≧50 | 30 | 30 | 25 | 35 | 30–35 |
| Specular gloss | 80–85 | 80 | 80 | 80 | 83 | 75–80 | 85–90 | 85 | 90 | 88 | 85 |

*Comparative sample

It is apparent from the results shown in Table 2 that coating composition samples according to the present invention show well-balanced results.

EXAMPLE 2

Powder coating compositions having the same composition as that of sample No. 3 in Example 1 were prepared except that the bisphenol A epoxy resin varied molecular weight was substituted for the Epikote 1004. The edge coverage, adhesiveness, and specular gloss for the samples were measured in the same manner as in Example 1 and the results are given with reference to the number average molecular weight in Table 3. The epoxy resins used are as follows.

A. A 50:10 mixture by weight of Epikote 828 (number average molecular weight of about 380) and Epikote 1007 (number average molecular weight of about 2,900)

B. A 43:17 mixture by weight of Epikote 828 (number average molecular weight of about 380) and Epikote 1007 (number average molecular weight of about 2,900).

C. A 13:47 mixture by weight of Epikote 828 (number average molecular weight of about 380) and Epikote 1009 (number average molecular weight of about 3,800).

D. A 8:52 mixture by weight of Epikote 1001 (number average molecular weight of about 900) and bisphenol A type epoxy resin synthesized by a conventional method (number average molecular weight of about 6,000).

E. Bisphenol A type epoxy resin synthesized by a conventional method (number average molecular weight of about 6,000)

The number average molecular weight in Table 3 are given for the mixture of bisphenol A type epoxy resins.

TABLE 3

| | 1* | 2 | 3 | 4 | 5* |
|---|---|---|---|---|---|
| Epoxy resin | A | B | C | D | E |
| Number average molecular weight | 1,500 | 1,700 | 3,000 | 4,500 | 5,000 |
| Edge coverage (%) | 30 | 56 | 69 | 71 | 84 |
| Adhesiveness (kg/cm$^2$) | 230 | 235 | 240 | 201 | 191 |

TABLE 3-continued

| | 1 | 2 | 3 | 5 | 5 |
|---|---|---|---|---|---|
| Specular gloss | 85–90 | 85 | 70 | 65 | 60 |

It is apparent from the results shown in Table 3 that coating composition samples according to the present invention show well-balanced results.

EXAMPLE 3

Epoxy resin powder coating composition as shown in Table 4 were prepared.

Epikote 1010: a bisphenol-A epoxy resin having a number-average molecular weight of about 5,500, with a melting point of 169° C.; from Yuka Shell Epoxy Co., Ltd.

Epikote 1009: a bisphenol-A epoxy resin having a number-average molecular weight of about 3,750, with a melting point of 148° C.; from Yuka Shell Epoxy Co., Ltd.

Epikote 1001: a bisphenol-A epoxy resin having a number-average molecular weight of about 900, with a melting point of 68° C.; from Yuka Shell Epoxy Co., Ltd.

Then, each of the samples were coated on slots of motor rotors at 180° to 260° C. using a flow-immersion method and the properties of each of the obtained films were investigated using the same methods as in Example 1. The results are given in Table 5.

TABLE 4

| Composition component (part by weight) | Sample No. | | | | | | |
|---|---|---|---|---|---|---|---|
| | 12 | 13 | 14 | 15 | 16 | 17 | 18 |
| Epikote 1010 | — | — | — | — | — | — | 30 |
| Epikote 1009 | — | — | — | — | 30 | 60 | — |
| Epikote 1007 | 10 | 45 | 80 | 30 | — | — | — |
| EOCN 104 | 10 | 10 | 10 | — | 10 | 10 | 10 |
| Epikote 1004 | 80 | 45 | 10 | 60 | — | — | — |
| Epikote 1001 | — | — | — | — | 60 | 30 | 60 |
| Rubber modified epoxy resin | — | — | — | — | — | — | — |
| Rubber powder | 5.0 | 5.0 | 5.0 | 10.0 | 10.0 | 10.0 | 10.0 |
| Hycar-CTBN | — | — | — | — | — | — | — |
| Calcium carbonate | 60 | 60 | 35 | 60 | 60 | 35 | 35 |
| Levelling agent | 0.2 | 0.2 | 0.2 | 0.2 | 0.2 | 0.2 | 0.2 |
| Hardener A | 0.35 | 0.35 | 0.35 | 0.35 | 0.35 | 0.35 | 0.4 |
| Hardener B | — | — | — | — | — | — | 1.4 |
| DAM | 1.0 | 1.0 | 1.0 | 1.0 | 1.0 | 1.0 | — |

TABLE 4-continued

| Composition component | Sample No. | | | | | | |
|---|---|---|---|---|---|---|---|
| (part by weight) | 12 | 13 | 14 | 15 | 16 | 17 | 18 |
| ADH | 5.0 | 5.0 | 5.0 | 5.0 | 5.0 | 5.0 | — |
| Chromium oxide | 3.0 | 3.0 | 3.0 | 3.0 | 3.0 | 3.0 | 3.0 |

TABLE 5

| Film Properties | Sample No. | | | | | | |
|---|---|---|---|---|---|---|---|
|  | 12 | 13 | 14 | 15 | 16 | 17 | 18 |
| Number-average molecular weight of bisphenol A epoxy resin | 1,750 | 2,250 | 2,760 | 2,120 | 1,870 | 2,830 | 2,430 |
| Edge coverage (%) | 58 | 60 | 62 | 55 | 58 | 60 | 63 |
| Thermal resistance (HDT, °C.) | 128 | 125 | 120 | 115 | 120 | 118 | 115 |
| Adhesiveness (kg/cm²) | 230 | 235 | 233 | 240 | 245 | 250 | 256 |
| Impact resistance (cm) | 45 | 40–45 | 45 | 40 | ≧50 | ≧50 | ≧50 |
| Specular gloss | 80 | 80 | 82 | 75–80 | 75–80 | 75 | 75 |

It is apparent from the results shown in Table 5 that coating composition samples according to the present invention show well-balances results.

While the invention has been described in detail and with reference to specific embodiments thereof, it will be apparent to one skilled in the art that various changes and modifications can be made therein without departing from the spirit and scope thereof.

What is claimed is:

1. An epoxy resin powder coating composition which comprises:
   (A) an epoxy resin comprising mainly of a bisphenol A epoxy resin mixture of (a) a bisphenol A epoxy resin having a number average molecular weight of from 2,500 to 8,000 and (b) a bisphenol A epoxy resin having a number average molecular weight of from 350 to 1,700, said mixture having a number average molecular weight of from 1,700 to 4,500;
   (B) rubber powder in an amount of 2 to 30 parts by weight per 100 parts by weight of said epoxy resin (A);
   (C) at least one hardener; and
   (D) a filler.

2. An epoxy resin powder coating composition as in claim 1, wherein the number average molecular weight of said bisphenol A epoxy resin mixture is from 1,800 to 4,000.

3. An epoxy resin powder coating composition as in claim 2, wherein the number average molecular weight of said bisphenol A epoxy resin mixture is from 2,000 to 3,000.

4. An epoxy resin powder coating composition as in claim 1, wherein the number average molecular weight of (b) is from 800 to 1700.

5. An epoxy resin powder coating composition as in claim 1 further comprising a bisphenol A epoxy resin having a number average molecular weight of from 1,700 to 2,500.

6. An epoxy resin powder coating composition as in claim 1 further comprising a polyfunctional epoxy resin having three or more epoxy groups in the molecule in an amount of from 5 to 40% by weight of the total amount of the epoxy resins.

7. An epoxy resin powder coating composition as in claim 6, wherein said polyfunctional epoxy resin is selected from the group consisting of novolak epoxy resins, triglicydyl ether epoxy resins and tetraglicydyl ether epoxy resins.

8. An epoxy resin powder coating composition as in claim 1, wherein said rubber powder has a particle size in the range of from about 100 to 500 μm.

9. An epoxy resin powder coating composition as in claim 1, wherein said filler is calcium carbonate.

10. An epoxy resin powder coating composition as in claim 1, wherein said filler is present in an amount of from 5 to 25 parts by weight per 100 parts by weight of rubber powder.

11. An epoxy resin powder coating composition as in claim 1, wherein said hardener comprises an imidazole compound which is contained in said composition in an amount of from 0.1 to 5 parts by weight per 100 parts by weight of the total amount of the epoxy resins.

12. An epoxy resin powder coating composition as in claim 11, wherein said imidazole compound is a high speed hardener represented by general formula (II):

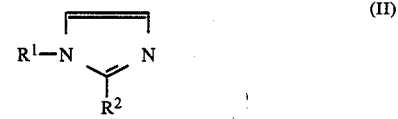

wherein $R^1$ represents a hydrogen atom or an alkyl group substituted with an aryl group, and $R^2$ represents a substituted or unsubstituted alkyl group or an aryl group.

13. An epoxy resin powder coating composition as in claim 12, wherein said hardener further comprises a low speed hardener represented by general formula (III):

wherein $R^3$ represents an alkyl group substituted with a cyano group and $R^4$ represents a substituted or unsubstituted alkyl group or an aryl group.

14. An epoxy resin powder coating composition as in claim 13, wherein the amount of said high speed hardener is from 0.05 to 0.7 part by weight per 100 parts by weight of the total amount of epoxy resins and the amount of said low speed hardener is from 0.5 to 3 parts by weight per 100 parts by weight of the total amount of epoxy resins.

* * * * *